(12) United States Patent
Lv et al.

(10) Patent No.: US 10,367,343 B2
(45) Date of Patent: Jul. 30, 2019

(54) RIGID-COLLISION-FREE TRANSMISSION LINE SPACER CLAMP CONNECTION STRUCTURE

(71) Applicants: State Grid Henan Electric Power Research Institute, Henan (CN); Nanjing Power Fittings Design and Research Institute Co., Ltd., Jiangsu (CN); State Grid Corporation of China, Beijing (CN); Henan Epri Electric Power Technology Co., Ltd., Henan (CN)

(72) Inventors: Zhongbin Lv, Henan (CN); Xiaohui Yang, Henan (CN); Xiaoshi Kou, Henan (CN); Qing Li, Henan (CN); Ming Lu, Henan (CN); Shujie Zhao, Henan (CN); Wenjun Ai, Henan (CN); Huiping Wang, Jiangsu (CN); Jianhua Yong, Jiangsu (CN); Yingbiao Shao, Henan (CN); Jianlin Wei, Henan (CN); Longyuan Chen, Jiangsu (CN); Zehui Liu, Henan (CN); Wei Yang, Henan (CN); Bo Zhang, Henan (CN); Yinhao Bai, Henan (CN); Kai Xie, Henan (CN); Chao Wang, Henan (CN); Yupeng Zhang, Henan (CN); Kai Pang, Henan (CN); Mengli Li, Henan (CN); Gaoli Song, Henan (CN); Bo Liu, Henan (CN); Pengliang Ren, Henan (CN); Furong Liu, Henan (CN)

(*) Notice: Subject to any disclaimer, the term of this patent is extended or adjusted under 35 U.S.C. 154(b) by 0 days.

(21) Appl. No.: 15/527,480

(22) PCT Filed: Sep. 6, 2016

(86) PCT No.: PCT/CN2016/000509
§ 371 (c)(1),
(2) Date: May 17, 2017

(87) PCT Pub. No.: WO2017/063303
PCT Pub. Date: Apr. 20, 2017

(65) Prior Publication Data
US 2018/0337524 A1 Nov. 22, 2018

(30) Foreign Application Priority Data

Oct. 16, 2015 (CN) .......................... 2015 1 0667206

(51) Int. Cl.
| | | |
|---|---|---|
| *H02G 7/12* | (2006.01) | |
| *F16F 3/087* | (2006.01) | |
| *F16F 15/08* | (2006.01) | |

(52) U.S. Cl.
CPC ............. *H02G 7/12* (2013.01); *F16F 3/0873* (2013.01); *F16F 15/08* (2013.01)

(58) Field of Classification Search
USPC ........................................................ 248/573
See application file for complete search history.

(56) References Cited

U.S. PATENT DOCUMENTS

| 3,161,721 A | * | 12/1964 | Torr | ........................ | H02G 7/12 |
| | | | | | 174/146 |
| 3,475,544 A | * | 10/1969 | Reed | ..................... | H02G 7/125 |
| | | | | | 174/146 |

(Continued)

FOREIGN PATENT DOCUMENTS

| CN | 2206506 Y | 8/1995 |
| CN | 201629541 U | 11/2010 |
| CN | 103280754 A | 9/2013 |

OTHER PUBLICATIONS

PCT international search report for PCT/CN2016/000509, dated Nov. 30, 2016.

*Primary Examiner* — Monica E Millner

(74) *Attorney, Agent, or Firm* — Sarita L. Pickett

(57) ABSTRACT

A rigid-collision-free transmission line spacer clamp connection structure includes a spacer frame, rotating joint rubber gaskets and spacer connecting clamps, the spacer frame being uniformly provided with a plurality of rotating joint slots that are rotationally connected with spacer connecting clamps, adopting a "spacer frame, rotating joint rubber gasket and spacer connecting clamp body tail" connection form. The spacer connecting clamp has a connecting rod and a clip, the connecting rod being provided with a connecting rod mounting hole at a rear end and the rotating joint slot being provided with a rotating joint rubber gasket and a spacer connecting clamp rotating shaft therein. The spacer connecting clamp rotating shaft penetrates through the connecting rod mounting hole and a rotating joint rubber gasket mounting hole.

8 Claims, 6 Drawing Sheets

(56) References Cited

U.S. PATENT DOCUMENTS

| | | | |
|---|---|---|---|
| 3,748,370 A * | 7/1973 | Dalia | H02G 7/125 174/42 |
| 3,971,881 A * | 7/1976 | Hawkins | H02G 7/125 174/42 |
| 3,978,276 A * | 8/1976 | Poffenberger | H02G 7/125 174/42 |
| 3,979,553 A * | 9/1976 | Smart | H02G 7/125 174/42 |
| 4,188,502 A * | 2/1980 | Gagne | H02G 7/125 174/146 |
| 4,242,537 A * | 12/1980 | Hearnshaw | H02G 7/125 174/146 |
| 4,381,422 A * | 4/1983 | Traini | H02G 7/125 174/42 |
| 4,384,166 A * | 5/1983 | Nigol | H02G 7/125 174/146 |
| 4,471,156 A * | 9/1984 | Hawkins | H02G 7/125 174/146 |
| 4,480,149 A * | 10/1984 | Hawkins | H02G 7/125 174/146 |
| 4,533,785 A * | 8/1985 | Riganti | H02G 7/125 174/146 |
| 5,371,320 A | 12/1994 | Torok et al. | |
| 5,721,393 A * | 2/1998 | Richardson, Jr. | H02G 7/125 174/146 |
| 9,551,437 B2 * | 1/2017 | Defrance | F16L 3/1075 |
| 2009/0000100 A1 * | 1/2009 | Kwon | H02G 7/14 29/402.08 |
| 2015/0014050 A1 * | 1/2015 | Tufari | H02G 7/125 174/40 CC |
| 2015/0229113 A1 * | 8/2015 | Dobrinski | H02G 7/125 174/42 |
| 2017/0194781 A1 * | 7/2017 | Bentley | H02G 7/125 |

* cited by examiner

RIGID-COLLISION-FREE TRANSMISSION LINE SPACER CLAMP CONNECTION STRUCTURE

BACKGROUND OF THE INVENTION

1. Field of the Invention

The present invention relates to a protection fitting for an overhead transmission line, and in particular relates to a rigid-collision-free transmission line spacer clamp connection structure.

2. Description of the Prior Art

In an overhead transmission line, a spacer serves to prevent flagellation between sub-conductors in a bundle and resist aeolian vibration and subspan oscillation, etc. The spacer mainly includes a frame body and a connecting clamp connected to a frame. A clip of the connecting clamp is used for clenching the sub-conductors in the bundle, and the clip is rotated a certain angle along a tangential direction under the action of an axial torsional force of the conductor through a limiting structure at the joint between the frame body and the connecting clamp.

According to the power industry standards *Requirements and Tests for Overhead Line Spacers* (DL/T 1098-2009), a spacer should have certain mechanical strength under tests of clamp strength, along-line grip, twisting moment, tension and pressure in the horizontal and vertical directions and the like, and should also have certain resistance against vibration fatigue.

The clamp clip of the spacer grips the sub-conductors in the bundle through a rubber sheet with a pad. In this way, the sub-conductors in the bundle can be fixed so that the conductor does not displace along the direction of the line during aeolian vibration or galloping of the conductor, and also a small amount of energy generated during aeolian vibration can be dissipated on the elastic gasket. However, the existing rubber gasket is only provided with one cylindrical clamping block, and the spacer often drops out of the spacer clip during transport, installation and use.

At the joint between the frame and the clamp of the existing spacer, in most cases, a limiting boss structure is arranged on the frame or a kidney hole is formed at the joint, so that the clamp can be rotated a certain angle along a tangential direction under the action of an axial torsional force of the conductor, i.e. the frame body and the spacer connecting clamp body tail being in direct contact, and using a hard connection configuration. During galloping of the conductor, subspan oscillation and conductor vibration in other forms, the spacer is subject to the torsional force and bending forces from different directions, and the hard connection structure suffers from severe collision, which is very likely to cause abrasion or even rupture and damage of the limiting structure at the joint between the clamp and the frame. If galloping occurs again in the line after the spacer is damaged, it may result in broken strands or abrasion of the conductor near the spacer, and may even lead to rupture of the conductor when it is serious, thus causing great harm to the line operation.

SUMMARY OF THE INVENTION

The present invention provides a rigid-collision-free transmission line spacer clamp connection structure, which can prevent dropping of a rubber gasket from the inside of a clamp clip, and the hard connection structure of the existing spacer is improved into a soft connection structure, thus avoiding tear, deformation and the like at spacer rotating joints, reducing damage to the spacer due to galloping of the conductor, and improving the anti-galloping performance of the spacer.

The present invention adopts the following technical solution:

A rigid-collision-free transmission line spacer clamp connection structure includes a spacer frame, rotating joint rubber gaskets and spacer connecting clamps, the spacer frame being uniformly provided with a plurality of rotating joint slots, each of which is rotationally connected with a spacer connecting clamp therein; the spacer connecting clamp includes a connecting rod and a clip, the clip being arranged at a front end of the connecting rod, the clip being provided with an elastic material at the inner side, the elastic material being clamped to the clip, the connecting rod being provided with a connecting rod mounting hole at a rear end; and the rotating joint slot is provided with a rotating joint rubber gasket and a spacer connecting clamp rotating shaft therein, the rotating joint rubber gasket being provided with a rotating joint rubber gasket mounting hole at the center, the spacer connecting clamp rotating shaft penetrating through the connecting rod mounting hole and a rotating joint rubber gasket mounting hole.

The spacer connecting clamp further includes a clip cover plate, the connecting rod and the clip form an integral structure, a front end of the clip and a front end of the clip cover plate being hinged via a clip rotating shaft, the clip and the clip cover plate being each provided with an elastic material at the inner side, the elastic material being clamped to the clip and the clip cover plate.

The clip includes a horizontal connecting part, a vertical connecting part and a clamp clip body, wherein a lower surface of the horizontal connecting part is connected to the front end of the connecting rod; a first end of the horizontal connecting part is connected to a rear end of the vertical connecting part; a front end of the vertical connecting part is connected to a rear end of the clamp clip body; the clamp clip body is an arc-shaped clamp clip body; and a front end of the clamp clip body is hinged to the front end of the clip cover plate through the clip rotating shaft.

The clip cover plate includes a clip cover plate body and a limiting part, wherein the clip cover plate body and the limiting part form an integral structure; the clip cover plate body is an arc-shaped clip cover plate body; a front end of the clip cover plate body is hinged to the front end of the clamp clip body through the clip rotating shaft; a rear end of the clip cover plate body is connected to the limiting part; a second end of the horizontal connecting part of the clip is provided with a limiting hinge pin which is detachably connected to the clip; and when the clip cover plate body and the clamp clip body form a closed state, the limiting hinge pin is located at the outer side of the limiting part to form a stop limit.

The clamp clip body and the clip cover plate body are each provided with one or more clamping grooves at the inner side, and the outer surface of the elastic material is correspondingly provided with one or more clamping blocks, the shape of the clamping blocks being matched with that of the clamping grooves; and a space defined by the elastic material arranged at the inner side of the clamp clip body and the elastic material arranged at the inner side of the clip cover plate body is matched with the shape of sub-conductors in a bundle of a transmission line.

The elastic material is a rubber gasket, and the clamping block is cylindrical and/or strip-shaped.

The rotating joint rubber gasket is a circular rubber plate, an upper surface of the circular rubber plate being provided symmetrically with two bosses, the shape of the sides of the bosses close to the rotating joint rubber gasket mounting hole being matched with that of an arc-shaped projection on the connecting rod; and edges of the connecting rod at two sides of the connecting rod mounting hole project radially outwards along the connecting rod mounting hole to form arc-shaped projections.

The rotating joint slot is also provided symmetrically with two limiting blocks therein, and the lower parts of the bosses are symmetrically provided with two limiting grooves matched with the limiting blocks.

The spacer frame is of a double-frame-board structure, with an upper frame board and a lower frame board being correspondingly provided with bumps and grooves receptively, and the upper frame board and the lower frame board being bucked to form the spacer frame.

Rivet holes are formed in the spacer frame at two sides of the rotating joint slot, and rivets are arranged in the rivet holes.

In the present invention, by providing the connecting rod and the clip which form an integral structure, hinging the front end of the clip to the front end of the clip cover plate via the rotating shaft, and fixing the elastic material at the inner side of each of the clip and the clip cover plate by clamping, the problems of dropping of the rubber gasket from the inside of the spacer clip and bending and deformation of the clip are effectively solved, so that the conductor does not displace along the direction of the line during aeolian vibration or galloping of the conductor, and also a small amount of energy generated during aeolian vibration can be dissipated on the elastic gasket. Moreover, the spacer connecting clamp rotating shaft in the present invention is arranged in the connecting rod mounting hole and a rotating joint rubber gasket mounting hole, and the spacer connecting clamp is rotationally connected to the spacer frame through the connecting rod, and the hard connection structure of the existing spacer is improved into a soft connection structure by using the rotating joint rubber gasket, to reduce damage to the spacer due to galloping of the conductor.

Further, in the present invention, the rotating joint rubber gasket and the connecting rod of a special structure are additionally provided, and the connecting rod is limited at a certain angle by using the two bosses provided on the upper surface of the rotating joint rubber gasket, so that the connecting rod can be adjusted at an angle with the fixing shaft arranged at the rotating joints of the spacer frame as an axis; and the limiting grooves formed at the lower part of the bosses cooperate with the limiting blocks formed within the rotating joint slot of the spacer frame, so that the position of the rotating joint rubber gasket can be limited. By providing the rotating joint rubber gasket, the hard connection structure with the bosses of the existing spacer for position limitation is improved into the soft connection structure with rubber for position limitation. When the transmission line causes the clip to rotate, the tail of the connecting rod forming an integral structure with the clip can cause compression of the rotating joint rubber gasket at one side, and when arriving at a compression limit, the rotating joint rubber gasket causes the rotating joint of the spacer frame to be stressed, and the rotating joint rubber gasket deformed under compression can cause deformation at the rotating joint of the spacer frame and absorb energy. The existing spacer connection is changed from rigid impact of hard collision to elastic impact, and damage to the spacer due to galloping of the conductor is reduced by damping and releasing the impact.

In the present invention, the spacer frame is of a double-frame-board structure, the upper frame board and the lower frame board being bucked to form the spacer frame. In installation, the upper frame board and the lower frame board are buckled into a whole to form a rectangular cross section to increase the torsion resistance of the spacer frame. Rivet holes are formed in the spacer frame at two sides of the rotating joint slot and rivets are arranged in the rivet holes, so that the upper frame board and the lower frame board are riveted into a whole to prevent bolt fasteners from dropping from the spacer frame.

DETAILED DESCRIPTION OF THE PREFERRED EMBODIMENT

The present invention is described below in detail in conjunction with the drawings and embodiments.

As shown in FIGS. 1 to 8, a rigid-collision-free transmission line spacer clamp connection structure of the present invention includes a spacer frame 1, rotating joint rubber gaskets and spacer connecting clamps 2, the spacer frame 1 being uniformly provided with a plurality of rotating joint slots 8, each of which is rotationally connected with a spacer connecting clamp 2 therein.

Figure 1:
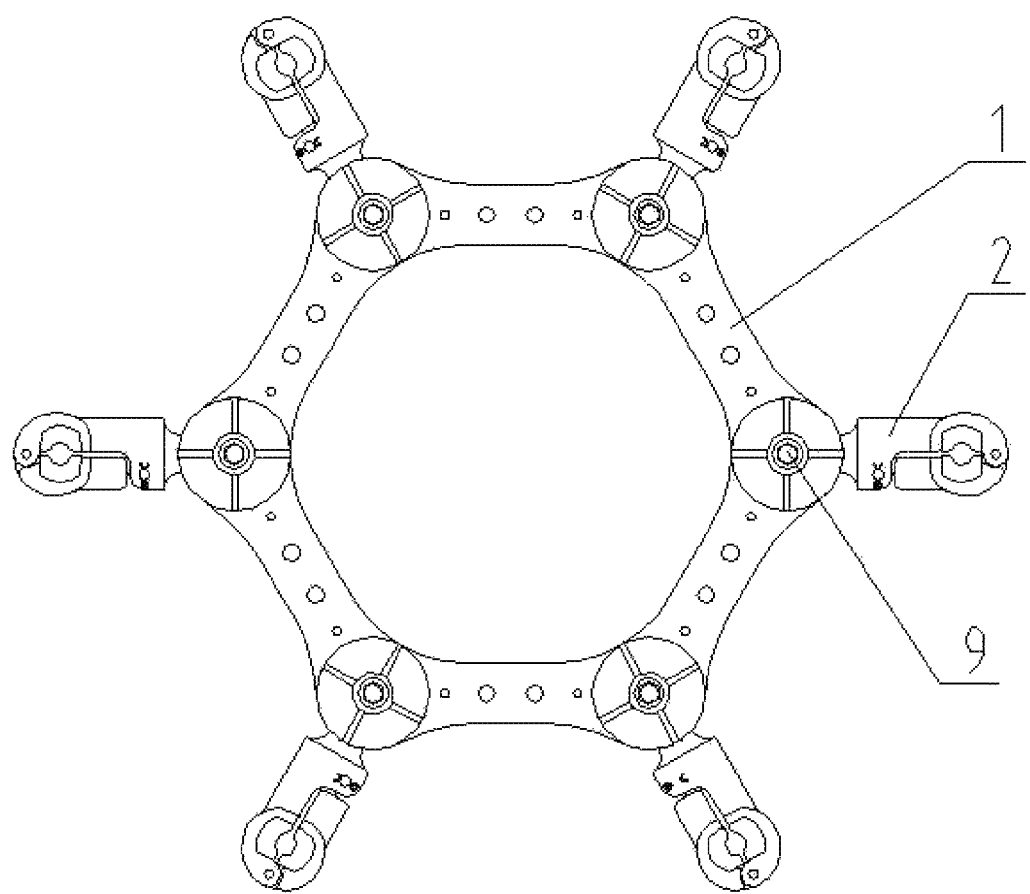
FIG. 1 is a structure diagram of the present invention.
Figure 2:
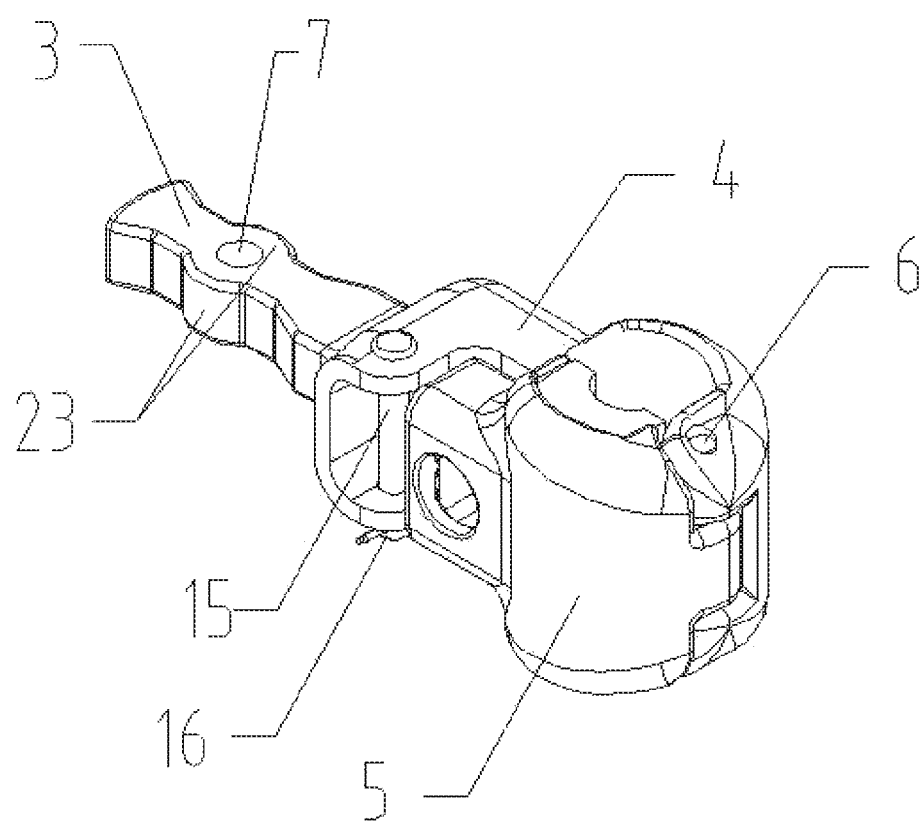
FIG. 2 is a structure diagram of a spacer connecting clamp.

As shown in FIG. 2, the spacer connecting clamp 2 includes a connecting rod 3, a clip 4 and a clip cover plate 5, the connecting rod 3 and the clip 4 forming an integral structure, the clip 4 being arranged at a front end of the connecting rod 3, a front end of the clip 4 and a front end of the clip cover plate 5 being hinged via a clip rotating shaft 6, the clip 4 and the clip cover plate 5 being each provided with an elastic material 19 at the inner side, the elastic material 19 being clamped to the clip 4 and the clip cover plate 5, the connecting rod 3 being provided with a connecting rod mounting hole 7 at a rear end and being used for connecting the clip 4 to the spacer frame 1. The clip 4 and the clip cover plate 5 can be opened and closed after being hinged, and can tightly clamp sub-conductors in a bundle of a transmission line. In the present invention, the clip 4 and the clip cover plate 5 are connected and fixed to the elastic material 19 by means of clamping, and furthermore the clip 4 and the clip cover plate 5 are hinged, thus effectively solving the problems of dropping of the rubber gasket from the inside of the clip 4 and bending and deformation of the clip 4.

Figure 3:
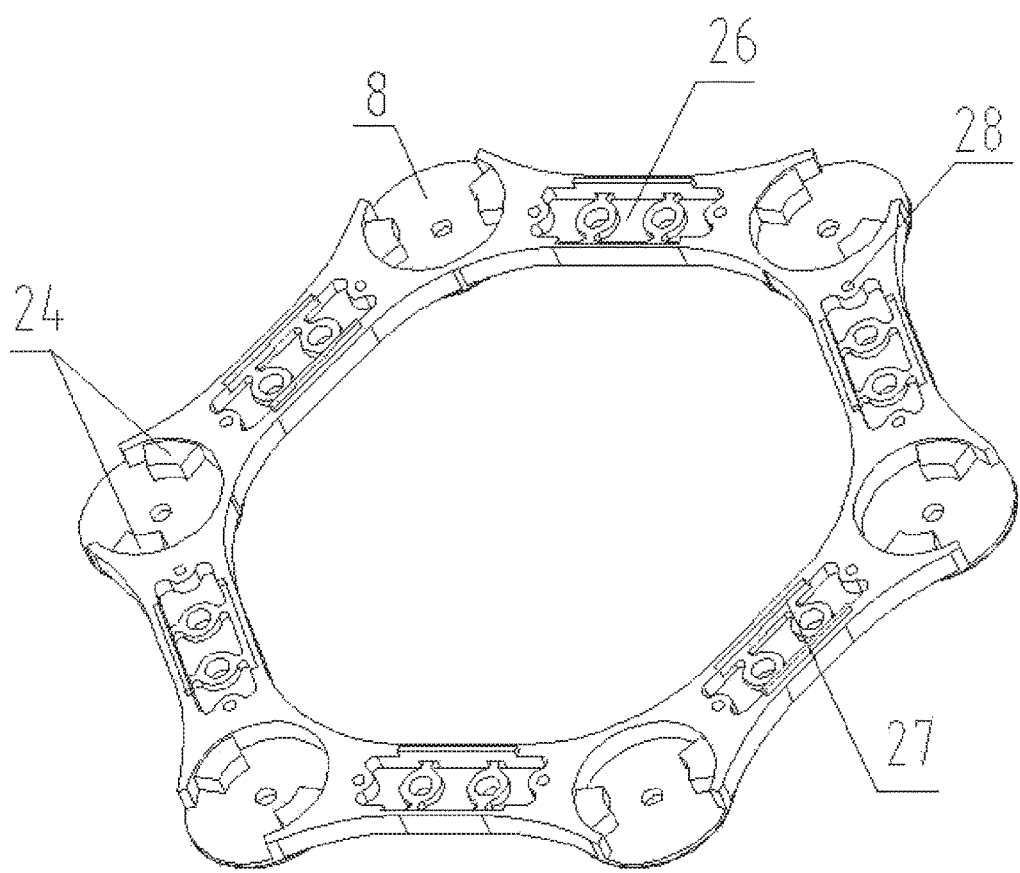
FIG. 3 is a structure diagram of a spacer frame.

As shown in FIG. 3, the spacer frame 1 is uniformly provided with a plurality of rotating joint slots 8. In this embodiment, there are 6 rotating joint slots 8. Each rotating joint slot 8 is provided with a rotating joint rubber gasket and a spacer connecting clamp rotating shaft 9 therein, the rotating joint rubber gasket being used for limiting the rear end of the connecting rod 3 at a certain angle, so that the connecting rod 3 can be adjusted at an angle with the spacer connecting clamp rotating shaft 9 arranged in the rotating joint slot 8 of the spacer frame 1 as an axis. The spacer connecting clamp rotating shaft 9 is arranged in the connecting rod mounting hole 7 and a rotating joint rubber gasket mounting hole 20, and the spacer connecting clamp 2 is rotationally connected to the spacer frame 1 through the connecting rod 3, and the hard connection structure of the existing spacer is improved into a soft connection structure by using the rotating joint rubber gasket, to reduce damage to the spacer due to galloping of the conductor.

Figure 4:
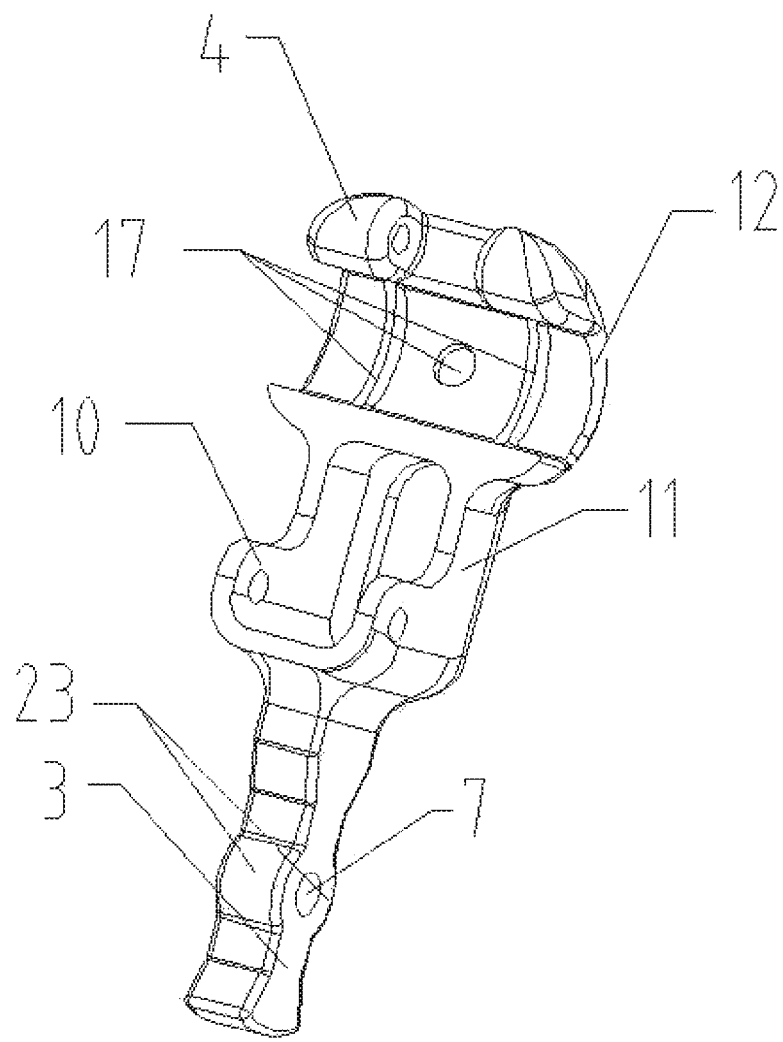
FIG. 4 is a structure diagram of a clip.

As shown in FIG. 4, the clip 4 includes a horizontal connecting part 10, a vertical connecting part 11 and a clamp clip body 12, wherein a lower surface of the horizontal connecting part 10 is connected to the front end of the connecting rod 3; a first end of the horizontal connecting part 10 is connected to a rear end of the vertical connecting part 11; a front end of the vertical connecting part 11 is connected to a rear end of the clamp clip body 12; the clamp clip body 12 is an arc-shaped clamp clip body 12; and a front end of the clamp clip body 12 is hinged to the front end of the clip cover plate 5 through the clip rotating shaft 6.

Figure 5:
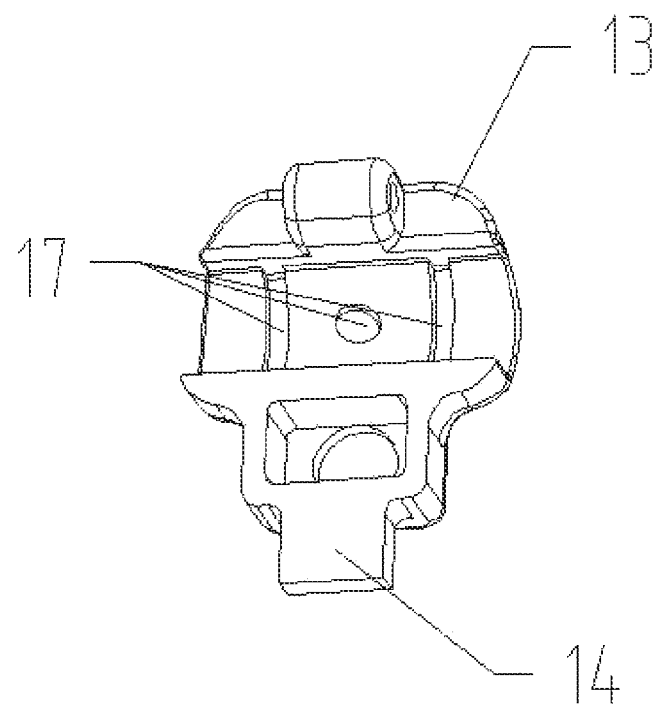
FIG. 5 is a structure diagram of a clip cover plate.

As shown in FIG. 5, the clip cover plate 5 includes a clip cover plate body 13 and a limiting part 14, wherein the clip cover plate body 13 and the limiting part 14 form an integral structure; the clip cover plate body 13 is an arc-shaped clip cover plate body 13; a front end of the clip cover plate body 13 is hinged to the front end of the clamp clip body 12 through the clip rotating shaft 6; a rear end of the clip cover plate body 13 is connected to the limiting part 14; a second end of the horizontal connecting part 10 of the clip 4 is provided with a limiting hinge pin 15 which is detachably connected to the clip 4; and when the clip cover plate body 13 and the clamp clip body 12 form a closed state, the limiting hinge pin 15 is located at the outer side of the limiting part 14 to form a stop limit. An R pin 16 is arranged radially at the bottom of limiting pin 15, and can prevent the limiting hinge pin 15 from being separated from the clip 4 under the action of gravity or other external forces.

Figure 6:
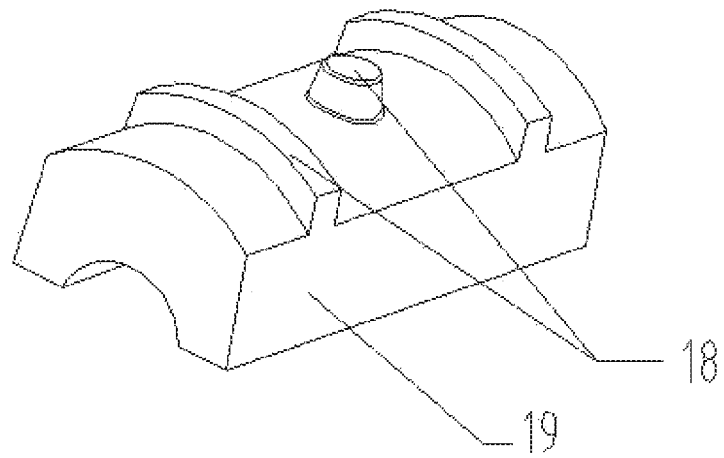
FIG. 6 is a structure diagram of an elastic material.

As shown in FIG. 6, the clamp clip body 12 and the clip cover plate body 13 are each provided with one or more clamping grooves 17 at the inner side, and the outer surface of the elastic material 19 is correspondingly provided with one or more clamping blocks 18, the shape of the clamping blocks 18 being matched with that of the clamping grooves 17, the elastic material 19 being connected and fixed to the clamp clip body 12 and the clip cover plate body 13 by means of clamping. The shape of a space defined by the elastic material 19 arranged at the inner side of the clamp clip body 12 and the elastic material 19 arranged at the inner side of the clip cover plate body 13 is matched with the shape of the sub-conductors in the bundle of the transmission line. In this embodiment, the elastic material 19 is a rubber gasket, and the clamping block 18 is cylindrical and/or strip-shaped.

In this embodiment, the clamp clip body 12 and the clip cover plate body 13 are each provided with three clamping grooves at the inner side, wherein a cylindrical clamping groove is formed at a middle position and strip-shaped clamping grooves are formed at two lateral sides; and the elastic material 19 is provided with three clamping blocks 18 at corresponding positions, the shape of the clamping blocks 18 being matched with that of the clamping grooves 17, wherein a cylindrical clamping block 18 is formed at a middle position and strip-shaped clamping grooves 18 are formed at two lateral sides.

In use, first the limiting hinge pin 15 is taken out and the clamp clip body 12 and the clip cover plate body 13 are opened, then the clamp clip body 12 and the clip cover plate body 13 are placed at two sides of the sub-conductors in the bundle of the transmission line, the clip cover plate body 13 and the clamp clip body 12 are brought into the closed state, the sub-conductors in the bundle of the transmission line are clamped tightly using the rubber gaskets arranged at the inner side of the clamp clip body 12 and the clip cover plate body 13, and finally the limiting hinge pin 15 is used to form the stop limit to the limiting part 14 of the clip cover plate 5.

Figure 7:
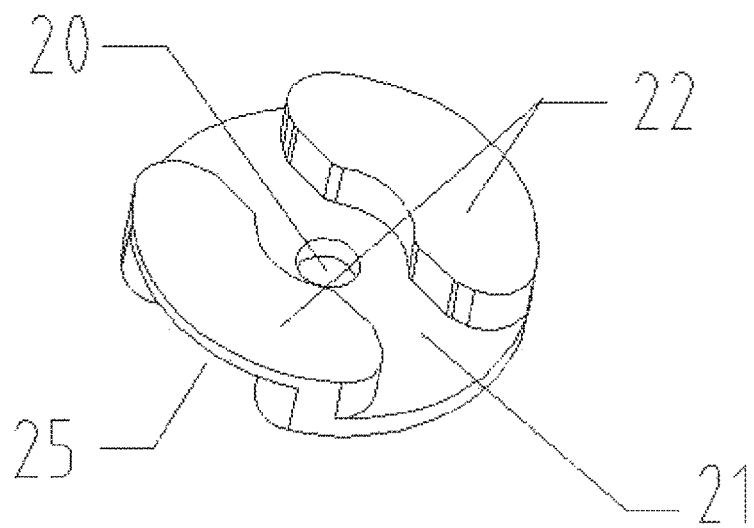
FIG. 7 is a structure diagram of a rotating joint rubber gasket.
Figure 8:
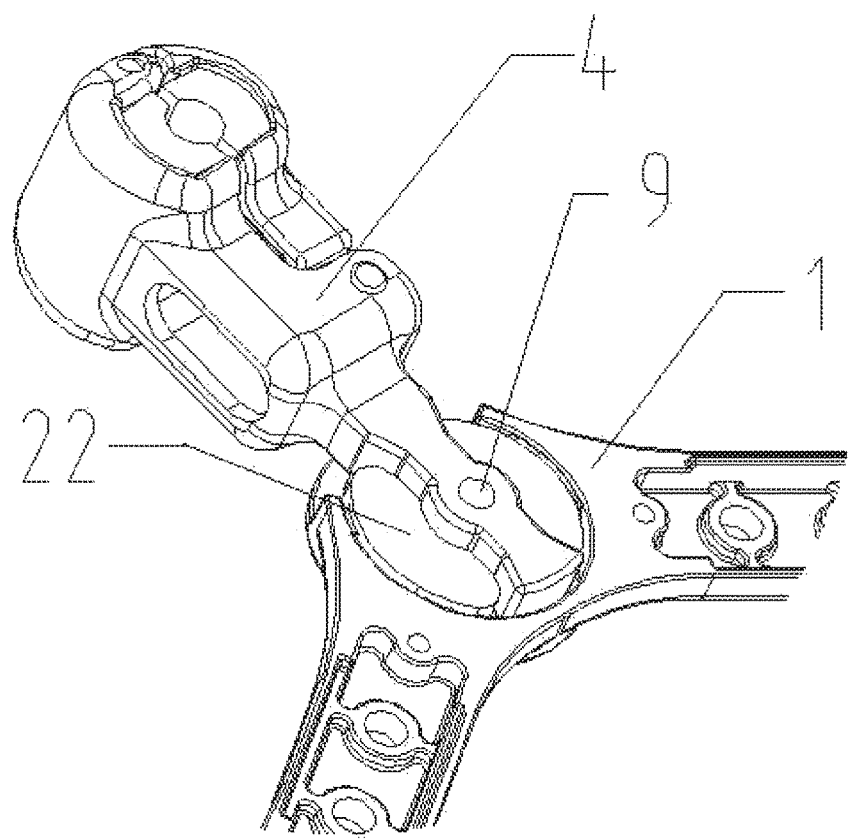
FIG. 8 is a structure diagram of a rotating joint slot.

As shown in FIG. 7, the rotating joint rubber gasket arranged inside the rotating joint slot 8 is a circular rubber plate 21 with a rotating joint rubber gasket mounting hole 20 formed at the center, an upper surface of the circular rubber plate 21 being provided symmetrically with two bosses 22, the shape of the sides of the bosses 22 close to the rotating joint rubber gasket mounting hole 20 being matched with that of an arc-shaped projection 23 on the connecting rod 3; and edges of the connecting rod 3 at two sides of the connecting rod mounting hole 7 project radially outwards along the connecting rod mounting hole 7 to form arc-shaped projections 23. The rotating joint slot 8 is also provided symmetrically with two limiting blocks 24 therein, and the lower parts of the bosses 22 are symmetrically provided with two limiting grooves 25 matched with the limiting blocks 24. In this embodiment, the rotating joint rubber gasket is made of a polyurethane rubber material.

As shown in FIGS. 1-8, after the spacer connecting clamp 2 is connected to the spacer frame 1, the rear end of the connecting rod 3 is placed between the two bosses 22 on the upper surface of the rotating joint rubber gasket, and the connecting rod mounting hole 7 and the rotating joint rubber gasket mounting hole 20 are in a coaxial state, and the spacer connecting clamp rotating shaft 9 penetrates through the rotating joint rubber gasket mounting hole 20 and the connecting rod mounting hole 7. The two bosses 22 on the upper surface of the rotating joint rubber gasket can limit the connecting rod 3 at a certain angle, so that the connecting rod 3 can be adjusted at an angle with the spacer connecting clamp rotating shaft 9 arranged in the rotating joint slot 8 of the spacer frame 1 as an axis. The limiting grooves 25 formed at the lower part of the bosses 22 cooperate with the limiting blocks 24 formed within the rotating joint slot 8 of the spacer frame, so that the position of the rotating joint rubber gasket can be limited.

The rotating joint rubber gasket of a special structure provided in this embodiment can cooperate within the two limiting blocks 24 arranged symmetrically within the rotating joint slot 8. The hard connection structure with the bosses 22 of the existing spacer for position limitation is improved into the soft connection structure with rubber for position limitation. When the sub-conductors in the bundle of the transmission line drives the clip 4 to rotate, the tail of the connecting rod 3 forming an integral structure together with the clip 4 can cause compression of the rotating joint rubber gasket at one side, and when arriving at a compression limit, the rotating joint rubber gasket drives the rotating joint of the spacer frame to be stressed, and the rotating joint rubber gasket deformed under compression can cause deformation at the rotating joint of the spacer frame 1 and absorb energy, to produce vibration damping and vibration fatigue reducing effect.

In the present invention, the spacer frame 1 is of a double-frame-board structure, with an upper frame board and a lower frame board being correspondingly provided with bumps 26 and grooves 27 receptively, and the upper frame board and the lower frame board being bucked to form the spacer frame 1. In installation, the upper frame board and the lower frame board are buckled into a whole to form a rectangular cross section to increase the torsion resistance of the spacer frame 1. After the upper frame board and the lower frame board are buckled, the rotating joint rubber gasket and the rear end of the connecting rod 3 are completely located within the space formed by the upper frame board, the lower frame board and the rotating joint slot 8. Rivet holes 28 are formed in the spacer frame 1 at two sides of the rotating joint slot 8, with rivets being positioned in the rivet holes 28, so that the upper frame board and the lower frame board are riveted into a whole to prevent bolt fasteners from dropping out of the spacer frame 1.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. A rigid-collision-free transmission line spacer clamp connection structure, comprising:
    a spacer frame;
    a plurality of rotating joint rubber gaskets wherein each of the rotating joint rubber gaskets is a circular rubber plate, an upper surface of the circular rubber plate being provided symmetrically with two bosses, the shape of the sides of the bosses close to a rotating joint rubber gasket mounting hole being matched with that of an arc-shaped projection on a connecting rod; and edges of the connecting rod at two sides of the connecting rod mounting hole project radially outwards along a connecting rod mounting hole to form arc-shaped projections; and
    a plurality of spacer connecting clamps, the spacer frame being uniformly provided with a plurality of rotating joint slots, each of which is rotationally connected with one of the plurality of spacer connecting clamps therein wherein each of the plurality of rotating joint slots is provided symmetrically with two limiting blocks therein, and the lower parts of the bosses are symmetrically provided with two limiting grooves matched with the limiting blocks;
    wherein each of the plurality of spacer connecting clamps comprises the connecting rod and a clip, the clip being arranged at a front end of the connecting rod, the clip being provided with an elastic material at the inner side, the elastic material being clamped to the clip, the connecting rod being provided with the connecting rod mounting hole at a rear end; and
    wherein each of the plurality of rotating joint slots is provided with one of the plurality of rotating joint rubber gaskets and a spacer connecting clamp rotating shaft therein, each of the plurality of rotating joint rubber gaskets being provided with the rotating joint rubber gasket mounting hole at the center, the spacer connecting clamp rotating shaft penetrating through the connecting rod mounting hole and the rotating joint rubber gasket mounting hole.

2. The rigid-collision-free transmission line spacer clamp connection structure of claim 1, wherein each of the plurality of spacer connecting clamps further comprises a clip cover plate, the connecting rod and the clip forming an integral structure, a front end of the clip and a front end of the clip cover plate being hinged via a clip rotating shaft, the clip and the clip cover plate being each provided with an elastic material at the inner side, the elastic material being clamped to the clip and the clip cover plate.

3. The rigid-collision-free transmission line spacer clamp connection structure of claim 2, wherein the clip comprises a horizontal connecting part, a vertical connecting part and a clamp clip body, wherein a lower surface of the horizontal connecting part is connected to a front end of the connecting rod; a first end of the horizontal connecting part is connected to a rear end of the vertical connecting part; a front end of the vertical connecting part is connected to a rear end of the clamp clip body; the clamp clip body is an arc-shaped clamp clip body; and a front end of the clamp clip body is hinged to the front end of the clip cover plate through the clip rotating shaft.

4. The rigid-collision-free transmission line spacer clamp connection structure of claim 3, wherein the clip cover plate comprises a clip cover plate body and a limiting part, wherein the clip cover plate body and the limiting part form an integral structure, the clip cover plate body being an arc-shaped clip cover plate body, a front end of the clip cover plate body being hinged to the front end of the clamp clip body through the clip rotating shaft, a rear end of the clip cover plate body being connected to the limiting part, a second end of the horizontal connecting part of the clip is provided with a limiting hinge pin which is detachably connected to the clip, and when the clip cover plate body and the clamp clip body form a closed state, the limiting hinge pin is located at the outer side of the limiting part to form a stop limit.

5. The rigid-collision-free transmission line spacer clamp connection structure of claim 4, wherein the clamp clip body and the clip cover plate body are each provided with one or more clamping grooves at the inner side, and an outer surface of the elastic material is correspondingly provided with one or more clamping blocks, the shape of the clamping blocks being matched with the one or more of the clamping grooves, and the shape of a space defined by the elastic material arranged at the inner side of the clamp clip body and the elastic material arranged at the inner side of the clip cover plate body is matched with the shape of sub-conductors in a bundle of a transmission line.

6. The rigid-collision-free transmission line spacer clamp connection structure of claim 5, wherein the elastic material is a rubber gasket, and the clamping block is one of cylindrical, strip-shaped, or cylindrical and strip-shaped.

7. The rigid-collision-free transmission line spacer clamp connection structure of claim 1, wherein the spacer frame is of a double-frame-board structure, with an upper frame board and a lower frame board being correspondingly provided with bumps and grooves receptively, and the upper frame board and the lower frame board being bucked to form the spacer frame.

8. The rigid-collision-free transmission line spacer clamp connection structure of claim 1, wherein the spacer frame has rivet holes formed in the spacer frame at two sides of the rotating joint slot, and rivets are arranged in the rivet holes.

* * * * *